Feb. 11, 1969  R. H. MARKS  3,426,891
CARGO CUSHION
Filed Sept. 25, 1967
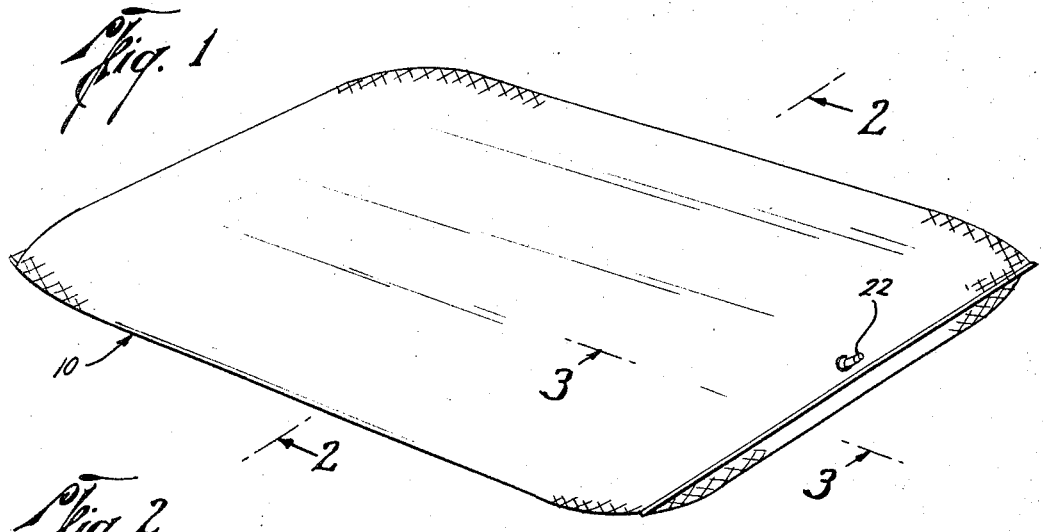
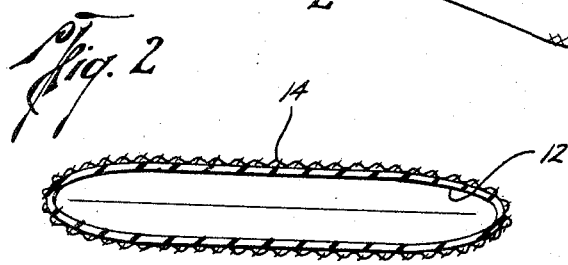
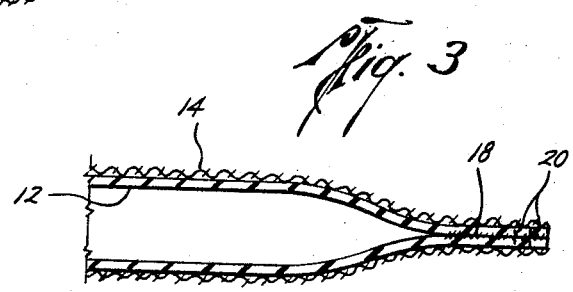
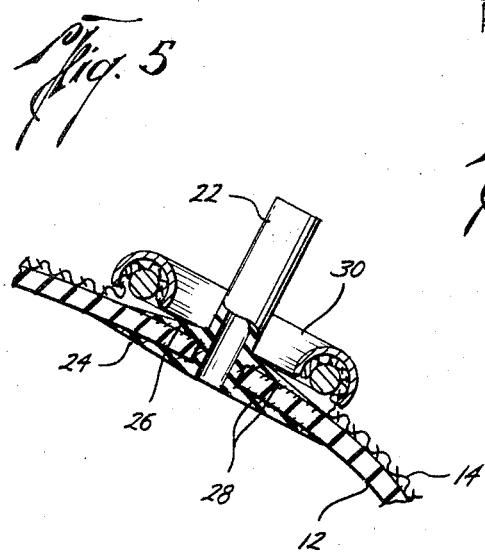
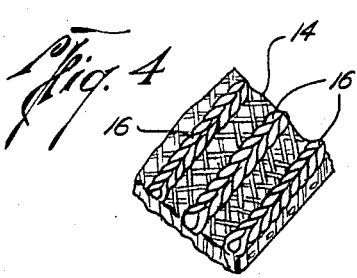
Ronald H. Marks
INVENTOR.
BY
ATTORNEYS

United States Patent Office 3,426,891
Patented Feb. 11, 1969

3,426,891
CARGO CUSHION
Ronald H. Marks, Dallas, Tex., assignor to American Can Company, New York, N.Y., a corporation of New Jersey
Continuation-in-part of application Ser. No. 544,926, Apr. 25, 1966, which is a continuation-in-part of application Ser. No. 404,823, Oct. 19, 1964. This application Sept. 25, 1967, Ser. No. 694,760
U.S. Cl. 206—46
Int. Cl. B65d 85/00, 57/00; B61d 45/00
10 Claims

ABSTRACT OF THE DISCLOSURE

An inflatable cargo cushion having an inner inflatable bladder and an outer close-knit fabric cover of paper or plastic in which the cover is tubular, has only transverse seams at the ends and is in firm engagement with the bladder when the latter is inflated, whereby an exterior impact applied to cushion is absorbed by both the deformation of the bladder and the deformation of the knitted fabric structure with the forces of said impact being distributed over a substantial area of said knitted fabric structure.

---

The present application is a continuation-in-part application of my prior copending application Ser. No. 544,926, filed Apr. 25, 1966, now abandoned, which was a continuation-in-part of my prior application Ser. No. 404,823, filed Oct. 19, 1964, now abandoned.

Background of the invention

In the packing of cargo for shipment it is almost always desirable that some padding or cushioning be provided surrounding the cargo to protect it from damage in transit. Inflatable bags or cargo cushions have been used in the past, but the majority of such inflatable bags have been relatively expensive and have obligated the receiver of the cargo to either return the cushions or to pay for them. Also they have been incapable of effectively absorbing all impact and shock forces, to which a cushion may be subjected, without rupture.

Many of the prior cushions have been composed of two elements, an inner bladder adapted to contain air under pressure to provide the cushioning effect and an outer covering to protect the bladder from puncturing. A typical example of one prior cargo cushion is one having a butyl rubber bladder and a casing of woven nylon or similar fabric impregnated with a synthetic rubber or neoprene, as for example, that shown in the patent to McManus 3,076,564; this type involves an outer woven covering having limited deformation characteristics. Another cargo cushion, which was specifically designed to be disposable, had an inflatable bladder contained within a paper or cardboard bag, such as disclosed in the prior patents to Tolby 3,072,270 and Feldkamp 3,199,689. None of these prior devices have produced a truly acceptable disposable cargo cushion since they are all a little more expensive than the average shipper would care to pay for a disposable item, and are subject to rupture because of the nondeformable characteristics of woven fabric, sheet paper or cardboard. Many of these devices have had the disadvantage that they would not sufficiently protect and support the bladder, and therefore such bladders were of necessity more expensive. These prior devices have not provided a disposable cargo cushion in which an inexpensive bladder may be used, and the cover surrounding the bladder would provide sufficient support and protection to the bladder under all conditions of impact forces and would further provide an external rough, wear-resistant surface which would retain its position with respect to the cargo and the carrier once it has been inflated.

It is therefore an object of the present invention to provide an inexpensive cargo cushion which is disposable after a single use, although actual practice has shown it may be used more than once if so desired.

Another object of the present invention is to provide an inexpensive cargo cushion having a relatively thin bladder surrounded by a cover which preferably presents a smooth inner surface for support of the bladder and a rough, wear-resistant outer surface to assist in retaining the cushion in position with respect to the cargo and carrier when in use.

Another object of the present invention is to provide an inflatable cargo cushion having an inner bladder and an outer knitted fabric cover, which outer knitted fabric cover is of a close-knit structure to protect the bladder when the latter is in its normal inflated condition, but which will, by reason of its knitted structure, distribute and absorb impact forces over an amplified area of the knitted structure of said cover.

A further object of the present invention is to provide an inflatable cargo cushion having a relatively weak bladder to contain gas under pressure and a cover surrounding said bladder, which cover will deform simultaneously with the bladder to conform to irregular surfaces and which will distribute forces of any impact over a substantially greater area than its specific area receiving the impact, whereby the cover supports and protects the bladder at all times.

A still further object of the present invention is to provide an inflatable cargo cushion having a nonporous bladder and a tubular knitted fabric cover.

Still another object of the present invention is to provide an inflatable cargo cushion having a bladder surrounded by a fabric cover in which the fabric of the cover is a knitted fabric including elements of paper, plastic, or a combination of said materials with each other or with another material, such as rayon or the like.

Still another object is to provide an inflatable cargo cushion having an inner bladder and an outer knitted fabric cover, at least a portion of said fabric being a close-knit plastic.

Brief description of the drawings

These and other objects of the present invention are hereinafter more fully explained and discussed in reference to the drawings wherein:

FIGURE 1 is a perspective view of the cargo cushions of the present invention;

FIGURE 2 is a transverse sectional view taken along lines 2—2 in FIGURE 1;

FIGURE 3 is a partial longitudinal sectional view taken along lines 3—3 in FIGURE 1;

FIGURE 4 is an enlarged view of a portion of the exterior surface of the cover of the cargo cushions illustrating the ridges on such surface; and FIGURE 5 is a detailed sectional view of the connection into the bladder of the cargo cushion of the present invention through which it may be inflated.

Description of the preferred embodiments

In the drawings the cargo cushion 10 of the present invention is shown to be inflated. Cushion 10 includes an inner bladder 12 surrounded and supported by the outer cover 14. The fabric structure of cover 14 is schematically illustrated in all but FIGURE 4. As shown in FIGURE 4, the fabric of cover 14 is a knitted fabric having the usual face ridges 16 formed on the side shown and having a substantially smooth surface on the other side. The side shown is generally called the face of the fabric and the other side is generally called the back of the fabric.

The bladder 12 is shown to have its ends closed by bonding or heat sealing, as illustrated at 18 in FIGURE 3. The bladder 12 may also have a longitudinal seam (not shown) which is suitably closed by bonding or heat sealing whereby the bladder 12 is adapted to contain a gas, such as air, under limited pressure.

It is preferred that the bladder 12 be made of a heat-sealable plastic or rubber material having a strength to contain pressures normally used in inflatable cargo cushions when fully enclosed and supported by the cover 14. This full support provided by the cover 14, as hereinafter more fully explained, allows the use of less expensive materials for the bladder 12. Such material must be non-porous to contain the air under pressure and have sufficient resiliency to withstand inflation and conform to the irregular cargo spaces to be filled by the cargo cushion 10.

Paper bags which have been used as covers in prior devices have a longitudinal seam which is not present in the cover 14. The cover 14, being a knitted fabric, does not have a longitudinal seam as it is preferably produced on a circular knitting machine which will produce a continuous tube of knitted fabric. The cover 14 is shown as having its ends closed by suitable stitching 20, as illustrated in FIGURE 3. The stitching 20 also may extend through one of the closed end portions of the bladder 12 but if desired, the stitching 20 may be positioned beyond the end portions of the bladder 12. It is further suggested that the bonding of the ends of the bladder 12 may be closed by a heat bonding which will also at least partially bond one or both of the end portions of the bladder 12 to the end portions of the cover 14. With such integral bonding, it is preferred to also include the stitching 20 through the bonded area to reinforce this bonding. The stitching 20 should not extend through into the interior of the bladder 12 as it would rupture bladder 12 and cause it to leak.

Stem 22 is provided to allow the inflation and deflation of the bladder 12. Stem 22 has integral flanges 24 and 26 and when installed is positioned within a hole in the bladder 12 with the flange 24 on the interior of the bladder 12 and the flange 26 on the exterior of the bladder 12. Both of the flanges 24 and 26 are heat sealed or otherwise suitably bonded, as at 28, to the bladder 12 and thereby provide a pressure-tight means for the inflation and deflation of the bladder 12. While not shown, a small valve or other closure is provided in stem 22 to retain the gas within the bladder 12 once it has been inflated. Other types of valves not requiring a projecting stem could be employed as the particular filling valve forms no part of the present invention.

The grommet 30 is positioned around stem 22 and engages the edges of the hole in the cover 14 through which stem 22 extends to reinforce these edges. Any suitable construction of grommet which will engage the edges of the cover 14 surrounding the stem 22 will be suitable for the purposes of the present invention. It is generally preferred that the size of the grommet 30 be smaller than the flange 26 so that the unreinforced portion of the bladder 12 is not exposed through the opening in the grommet 30.

The fabric of cover 14 is formed as a standard knitted fabric which may be produced on a circular or other type knitting machine. It is preferable to form the fabric on a circular knitting machine and such fabric will be tubular and therefore will not be a limitation on the length of the cargo cushion; also since the fabric is knitted, it will have the deformation characteristics of a knitted structure. The only size limitation resulting from the use of a circular knitting machine will be in the girth dimensions, and it is suggested that a different size knitting machine be used to supply fabric for the cover 14 of each different girth requirements. Standard size circular knitting machines will now produce a fabric having as large a girth as would be needed in cargo cushions. Such available girth is still larger than that which might be obtainable from the bagging machines used for the paper bag covers of the prior devices.

It has been discovered that a very satisfactory fabric for cover 14 may be achieved by the knitting of paper strips or paper yarn. The paper strips, or yarn, are relatively inexpensive and provide an outer surface which is wear resistant and also which will provide sufficient friction against cargo to assist in maintaining the cargo cushion in its desired position when installed. In addition to the paper strips, it may be desirable to include other elements, which may be waste fiber or inexpensive yarns, which are fed jointly to the knitting machine with the paper strips for knitting the combined elements into a tube of fabric which is suitable for the cover 14 of cargo cushion 10. Inclusion of such yarns in the fabric will provide body to the fabric without sacrificing the advantages (hereinafter discussed) of knitted paper strips. It is also contemplated by the present invention that the fabric of cover 14 may include strips of a thermoplastic material combined with paper strips. With a fabric knitted from paper and thermoplastic strips, the ends of the cover 14 may be closed simultaneously with the closing of the ends of the bladder 12 by jointly heating the portions of the cover 14 and the bladder 12 which are to be closed and bonded. The thermoplastic elements in the cover fabric will then bond the fabric to the bladder along the closure portions of each in response to the heat of bonding.

It is also contemplated that the cover 14 may be made of knitted plastic materials, such as polyethylene, polypropylene, nylon and other suitable plastic materials. Since the strands of many plastic materials stretch to some degree when subjected to tensile stresses, it is necessary to initially produce the fabric made from such materials as a very close-knit fabric whereby the fabric always provides protection for the bladder under all conditions of use. With the added stretch of the individual strands of the plastic covers as compared to the individual strands of paper covers, it is possible to utilize a bladder which has an inflated size which is larger than the original fabric size. With such a knitted plastic fabric cover, the inflation of the bladder may stretch, to a relatively minor degree, the individual strands of said knitted plastic fabric. This stretching of the plastic elements is believed to achieve an orientation of the molecular structure of the plastic elements to increase their unit strength but does not interfere with the deformation characteristic of the over-all knitted structure.

Since it is an object of the present invention to provide an inexpensive cargo cushion suitable for disposal after a single use or a relatively few uses, the materials used for the cover 14 must be inexpensive. It has been found that a low-grade paper cut into strips and knit into a fabric will be relatively inexpensive. By using a circular knitting machine for such knitting, a continuous tube of material will be produced which is suitable for use as the fabric of cover 14 and which will have the advantage of not requiring any longitudinal seam. The addition of waste fiber yarns or other inexpensive yarns will add sufficient body to the fabric and may be added to decrease the cost of the fabric if the yarns used are cheaper than the paper. Fabric for the cover 14 made from paper strips may be used because of several distinct advantages of a knitted paper fabric. These advantages are: a deformation characteristic under impact, the wear-resistant properties exhibited by knitted paper, the tendency of paper to crimp into place when knit which prevents raveling and running if the fabric is damaged, the limited stretchability of the individual strands making up the paper fabric, the ability of a paper fabric structure to deform without causing excessively large openings in the fabric, and the ability of the paper fabric to be made in any suitable size.

Cargo cushions, when provided with a cover of knitted plastic, may be made sufficiently inexpensive by proper material selection to produce a disposable unit. A knitted plastic cover provides an abrasive resistant, nonskid surface and readily conforms to fill the odd shapes encountered in cargo shipping and is always capable of deformation for shock-absorbing purposes. Additionally, a knitted plastic cover may be made to any desired size depending only upon the size of the knitting machine on which it is knitted, and such plastic cover, by reason of being a knitted structure, has a substantial ability to deform and stretch to a degree while maintaining sufficient support and protection for the bladder to allow a relatively inexpensive bladder to be used.

The ideal fabric for cover 14 would be one in which all of the above advantages would be present and one in which the fabric would provide a support for the bladder 12 of such uniformity that the cost of the material of the bladder could be reduced by making the bladder 12 from a less expensive, weaker, or thinner material. The cover of the present invention does achieve all of these advantages and therefore produces a cargo cushion which is disposable.

Depending upon the economics of the closing of the ends of the cushion and the manner of assembly of the bladders 12 within the covers 14, it may be a distinct economic advantage to combine thermoplastic strips with paper strips in the knitting of the fabric of the cover 14, since the savings in expense in assembly and closing the ends may be greater than the additional cost (if any) of the thermoplastic strips.

It is contemplated that the bladder 12 will be inserted in the tubular fabric forming the cover 14. If convenient, this may be done during the knitting of the fabric. The fabric may be precut to the desired length before inserting the bladder 12. With the bladder 12 in the fabric tube, a hole is made in the fabric through which stem 22 extends. This hole may be reinforced by assembly of grommet 30 or may be left without reinforcement. A knitted paper, because of the limited stretching of each paer strand and because of the crimping of the paper as knit, will not readily ravel or run as will most other knit fabrics. Therefore, reinforcement is not necessary to preserve the fabric and may be omitted to save the expense for disposable cargo cushions.

When a knitted plastic cover, knitted from plastic strips, is used, it has the advantage of crimping into place as hereinbefore mentioned with relation to paper. Such a knitted plastic cover therefore is not subject to runs and raveling. Further, a knitted plastic cover, if made of a thermoplastic material, may readily be fused at its edges to prevent raveling or running.

With the stem 22 projecting out through the cover 14, the ends of cover 14 are closed, either by sewing or by bonding. It is contemplated that bladder material in the form of a tube having inflation means may be inserted within the fabric tube during knitting and the ends of both the bladder 12 and the cover 14 closed and sealed at the same time. This simultaneous closing of the ends of both bladder 12 and the cover 14 may be accomplished directly from the knitting machine or from a roll of knitted fabric containing the tubular material for the bladder 12, and the fabric and bladder material may also be cut at the same time. However, the bladder may be completed as a separate unit and thereafter inserted within the outer knitted fabric cover.

With the fabric of the cover 14 being a knitted fabric, it is preferable, as previously mentioned, that the face ridges 16 of the fabric be positioned on the exterior of cover 14 and thereby the interior of cover 14 will be the back side of the fabric which in the ordinary knitted structure will provide a relatively smooth surface for engagement with the bladder 12, whereby any rubbing or chafing of the bladder by the interior surface of the cover is eliminated. This type fabric will allow the bladder to be made of a less expensive material or a thinner material. Another function of cover 14 is to protect the bladder 12 from the puncture which may result from the projection of sharp corners of cargo of the carrier being able to pass through the fabric of the cover 14 if the fabric of cover 14 is not a close-knit fabric. For this reason, it has been found desirable to incorporate the inexpensive yarns in the knitted paper fabric for the cover 14. Such additional yarns when properly combined by knitting with paper strips or yarn will provide sufficient body for the fabric to substantially lessen the possibility of a puncture of the bladder 12 by projections encountered in the use of the cargo cushion 10. Because of the ribs of the knitted fabric being disposed on the exterior of the knitted structure, the cargo cushion of the present invention presents a surface which provides sufficient friction to hold its position when installed and inflated, thus preventing shifting of cargo relative to the cushion.

From the foregoing it can be seen that the present invention provides a disposable cargo cushion which, though inexpensive, has sufficient strength and protection for the inflatable bladder at all times to function to maintain the position of cargo within a carrier and to protect the cargo from damage during shipment by reason of excessive impact or shock forces. The present invention also provides a cargo cushion having a wear-resistant, close-knit fabric cover which provides sufficient support and protection to the inflatable bladder that the material used for the bladder may be less expensive and of less strength than could be used if the cover did not provide such support and protection. The cargo cushion of the present invention, which includes paper in the knitted cover, is limited in stretching of the elements comprising the knitted structure but the over-all structure readily conforms to irregular surfaces and deforms to absorb shock under impact to protect the cargo without loss to the support and protection for the inflatable bladder. Close-knit plastic covers, while each individual strand may be capable of stretching to a greater degree than paper, provide sufficient support and protection for the inflatable bladder and readily conform to irregular contours.

By reason of the close-knit construction of the cover and regardless of the material of each strand, a substantially solid knitted cover encompasses the bladder when the latter is inflated and at this time, there is a firm engagement between bladder and cover. Whenever a direct impact force is suddenly applied against an area of the cushion, the bladder and its knitted structure casing are simultaneously deformed. The deformation of the outer casing is permitted by reason of its knitted structure, so that both the knitted structure of the bladder function together to absorb the shock of the impact forces. Additionally, and of importance, is the fact that the deformation of the knitted structure results in a distribution of the forces over a substantially greater area of said knitted structure than the particular area against which the direct impact has been exerted; this is accomplished because the various strands of the knitted structure are interconnected and a force applied to one specific area of the structure is actually transmitted and distribtued over a much greater area and, in fact, to some degree may be said to be transmitted to the entire area of the knitted structure. For this reason, the cushion may be subjected to considerably greater impacts and forces than prior cushions, without danger of rupture. It will thus be evident that the combination of an inflatable bladder and a knitted outer covering provides a cargo cushion in which impact or shock forces are absorbed by both the bladder and the knitted structure and additionally the knitted structure functions to distribute the forces over a substantial area of said structure whereby the impact or shock forces are not concentrated in a relatively small area of the outer casing, as is the case where woven or nonknitted material is employed as the outer covering.

Another advantage achieved by the cargo cushion of the present invention is that it is not limited in size except that the size of the knitting machine used to produce the fabric will be a limitation on the size, while other paper covers have been limited to a longitudinal seam and also to the size of the available paper. Further, the cover, when made of a close-knit fabric, may be made smaller than the maximum desired inflated size of the bladder and, because of its uniform support of the bladder, a less expensive bladder may be used.

The foregoing disclosure and description of the invention are illustrative and explanatory thereof, and various changes in the size, shape and materials, as well as in the details of the illustrated construction, may be made within the scope of the appended claims without departing from the spirit of the invention.

What is claimed is:
1. A cargo cushion comprising,
   an inflatable bladder of stretchable material,
   a valve assembly having one end secured in said bladder and its other end extending outwardly therefrom to permit the bladder to be inflated, and
   a cover encompassing said bladder and having a close knitted material structure whereby when the bladder is in a normal inflated condition, said cover forms a protective covering enclosing said bladder,
   the outer end of the valve assembly extending through said cover and accessible from the exterior of the cover,
   the material of said knitted cover structure having a smooth interior surface closely engaging said bladder when the latter is in a normal inflated condition,
   said knitted structure of the cover being deformable simultaneously with any deformation of the bladder as may be caused by an impact force applied to the cushion from the exterior thereof,
   said deformation of the knitted structure of said cover as caused by an exteriorly applied impact force resulting in the distribution of the applied force over a substantially greater area of the surface of said cover than the particular area of the cover to which said impact force is directly applied, whereby the deformation of the knitted structure of said cover combines with the deformation of the bladder to absorb impact forces.

2. A cargo cushion according to claim 1, wherein the cover is knitted to form exterior face ridges which provide for frictional engagement of cargo.

3. A cargo cushion according to claim 1, wherein said knitted structure of said cover is formed of paper strands.

4. A cargo cushion according to claim 1, wherein said knitted structure of said cover is formed of plastic strands.

5. A cargo cushion according to claim 1, wherein said knitted structure of said cover is formed of a combination of paper and plastic strands.

6. A cargo cushion according to claim 1, wherein said knitted structure of said cover is formed of a combination of paper strands and strands of another material.

7. A cargo cushion according to claim 1, wherein said knitted structure of said cover is formed of a combination of plastic strands and strands of another material.

8. A cargo cushion comprising,
   an inflatable bladder of stretchable material and having inflation means in communication with the interior of said bladder whereby said bladder may be inflated, and
   a cover being separate from and encompassing said bladder and having a structure formed by knitting a plurality of plastic strands which structure is close knit so that when the bladder is in a normal inflated condition, said cover forms a protective covering enclosing said bladder,
   said cover structure being in tubular form and having a smooth interior surface and closed ends,
   the plastic material of said knitted cover structure closely engaging said bladder when the latter is inflated,
   said knitted structure of the cover being deformable simultaneously with any deformation of the bladder as may be caused by an impact force applied to the cushion from the exterior thereof,
   said deformation of the knitted structure of said cover as caused by an exteriorly applied impact force resulting in the distribution of the applied force over a substantially greater area of the surface of said cover than the particular area of the cover to which said impact force is directly applied, whereby the deformation of the knitted structure of said cover combines with the deformation of the bladder to absorb impact forces.

9. A cargo cushion comprising,
   a tubular inflatable bladder of heat sealable, stretchable material, and
   a close knit tubular cover encompassing said bladder to form a protective covering enclosing said bladder,
   said cover being formed of heat sealable plastic strands, one end of said bladder and said cover being closed and bonded by a single heat bond.

10. A cargo cushion according to claim 9, including stitching extending through the bonded ends of said bladder and cover to reinforce the single heat bond.

References Cited

UNITED STATES PATENTS

| | | | |
|---|---|---|---|
| 1,950,571 | 3/1934 | Rubin. | |
| 2,354,436 | 7/1944 | Stedman. | |
| 2,721,462 | 10/1955 | Marks | 66—202 |
| 2,990,070 | 6/1961 | Cushman. | |
| 3,064,456 | 11/1962 | Bird | 66—202 |
| 3,076,564 | 2/1963 | McManus. | |
| 3,096,635 | 7/1963 | Somyk | 66—170 |
| 3,199,689 | 8/1965 | Feldkamp | 105—369 |

RAPHAEL H. SCHWARTZ, *Primary Examiner.*

U.S. Cl. X.R.

105—369; 214—10.5; 5—348